(12) United States Patent
Uraizee et al.

(10) Patent No.: US 11,291,944 B2
(45) Date of Patent: Apr. 5, 2022

(54) SOLVENT RECOVERY FROM SWEEP GAS STREAMS

(71) Applicant: SABIC GLOBAL TECHNOLOGIES B.V., Bergen op Zoom (NL)

(72) Inventors: Farooq Uraizee, Sugarland, TX (US); Danil Tirtowidjojo, Sugarland, TX (US); Ramesh Rameswaran, Sugarland, TX (US); Jayachandran Chandrasekaran, Sugarland, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 307 days.

(21) Appl. No.: 16/473,882

(22) PCT Filed: Dec. 19, 2017

(86) PCT No.: PCT/IB2017/058163
§ 371 (c)(1),
(2) Date: Jun. 26, 2019

(87) PCT Pub. No.: WO2018/122685
PCT Pub. Date: Jul. 5, 2018

(65) Prior Publication Data
US 2019/0336905 A1    Nov. 7, 2019

Related U.S. Application Data

(60) Provisional application No. 62/439,553, filed on Dec. 28, 2016.

(51) Int. Cl.
*B01D 53/00* (2006.01)
*B01J 2/00* (2006.01)
(Continued)

(52) U.S. Cl.
CPC ......... *B01D 53/002* (2013.01); *B01D 5/0027* (2013.01); *B01J 2/006* (2013.01);
(Continued)

(58) Field of Classification Search
CPC . B01D 3/002; B01D 3/72; B01D 3/77; B01D 5/0027; B01D 2256/22;
(Continued)

(56) References Cited

U.S. PATENT DOCUMENTS 4,086,705 A * 5/1978 Wehr .................. B01D 5/0087
34/469
4,102,157 A * 7/1978 Schuierer ................. D06B 9/06
68/5 D (Continued)

FOREIGN PATENT DOCUMENTS

CN    WO 2006/004424    1/2006
CN    101037371    9/2007
(Continued)

OTHER PUBLICATIONS

DE102007043624A1_ENG (Espacenet machine translation of Drescher) (Year: 2009).*
(Continued)

*Primary Examiner* — Jonathan Miller
*Assistant Examiner* — Gabriel E Gitman
(74) *Attorney, Agent, or Firm* — Norton Rose Fulbright US LLP

(57) ABSTRACT

A method for removing solvent from a solvent containing sweep gas stream obtained from a fertilizer coating process is disclosed. The method can include directly contacting the solvent containing sweep gas stream with an aqueous composition comprising 50% wt/wt to 100% wt/wt of water, condensing at least a portion of the solvent out of the solvent containing sweep gas stream into the aqueous composition
(Continued)

to produce a solvent-enriched aqueous composition and a recovered sweep gas stream, and removing the recovered sweep gas stream from the solvent-enriched aqueous composition.

17 Claims, 9 Drawing Sheets

(51) Int. Cl.
    *C05G 5/30*       (2020.01)
    *C05C 9/00*       (2006.01)
    *B01D 5/00*       (2006.01)
    *F26B 3/22*       (2006.01)
    *B05D 3/06*       (2006.01)
    *F26B 3/28*       (2006.01)

(52) U.S. Cl.
    CPC ............... *C05C 9/005* (2013.01); *C05G 5/30* (2020.02); *F26B 3/22* (2013.01); *B01D 2252/103* (2013.01); *B01D 2256/22* (2013.01); *B01D 2257/2064* (2013.01); *B01D 2257/556* (2013.01); *B01D 2258/02* (2013.01); *B05D 3/061* (2013.01); *B05D 3/066* (2013.01); *F26B 3/28* (2013.01)

(58) Field of Classification Search
    CPC ...... B01D 2257/2064; B01D 2257/556; B01D 2258/02; B01D 2252/103; B01D 2257/704; C05G 5/30; C05C 9/005; B05D 3/061; B05D 3/066; B01J 2/006; B01J 2/16; F26B 3/22; F26B 3/28
    See application file for complete search history.

(56) References Cited

U.S. PATENT DOCUMENTS

| | | | |
|---|---|---|---|
| 4,517,312 A * | 5/1985 | Kumasaka | C08J 11/08 521/47 |
| 4,594,266 A | 6/1986 | Lemaire et al. | |
| 4,624,867 A | 11/1986 | Iijima et al. | |
| 4,654,980 A | 4/1987 | Bhat | |
| 4,846,852 A * | 7/1989 | Schweitzer | B01D 53/04 95/125 |
| 4,988,377 A | 1/1991 | Manalastas et al. | |
| 5,211,985 A | 5/1993 | Shirley, Jr. et al. | |
| 5,305,533 A * | 4/1994 | Alexander | F26B 11/0445 34/549 |
| 5,395,449 A | 3/1995 | Quadir et al. | |
| 5,399,186 A * | 3/1995 | Derrah | C05G 5/37 71/64.02 |
| 7,682,425 B2 | 3/2010 | Niehues et al. | |
| 2012/0272700 A1* | 11/2012 | Nevin | C05C 9/005 71/12 |
| 2015/0133689 A1 | 5/2015 | Potthoff et al. | |

FOREIGN PATENT DOCUMENTS

| | | | |
|---|---|---|---|
| CN | 101357865 | 2/2009 | |
| CN | 101391924 | 3/2009 | |
| CN | 201280525 | 7/2009 | |
| CN | 103449939 | 12/2013 | |
| CN | 103449939 A * | 12/2013 | ............... C05G 3/90 |
| CN | 204699562 | 10/2015 | |
| CN | 105110951 | 12/2015 | |
| DE | 102007043624 A1 * | 3/2009 | ............... B01J 2/04 |
| GB | 2028294 | 3/1980 | |
| GB | 2028294 A * | 3/1980 | ............... B01J 2/12 |
| JP | 2004292294 | 10/2004 | |
| JP | 3640171 | 4/2005 | |

OTHER PUBLICATIONS

CN103449939A_ENG (Espacenet machine translation of Gao) (Year: 2013).*
Extended European Search Report issued in counterpart European U.S. Appl. No. 17/888,228, dated Sep. 24, 2020.
Office Action issued in counterpart Chinese Patent Application No. 201780087159.3, dated Sep. 22, 2020.
Search Report issued in counterpart Chinese Patent Application No. 201780087159.3, dated Sep. 14, 2020.
International Search Report and Written Opinion issued in International Patent Application No. PCT/IB2017/058163, dated Apr. 5, 2018.
Smallwood, Ian, "Solvent Recovery Handbook," 2002, p. 20.
Whim & Johnson, "Directory of Solvents" 1996, Chapter 7.5.2.1, p. 147-148.
Office Action issued in Corresponding Chinese Application No. 201780087159.3, dated May 18, 2021 (English Translation provided).
Search Report issued in Corresponding Chinese Application No. 201780087159.3, dated May 10, 2021 (No. English Translation provided).

* cited by examiner

SOLVENT RECOVERY FROM SWEEP GAS STREAMS

CROSS-REFERENCE TO RELATED APPLICATIONS

This application is a national phase application under 35 U.S.C. § 371 of International Application No. PCT/IB2017/058163, filed Dec. 19, 2017, which claims the benefit of priority of U.S. Provisional Application No. 62/439,553 filed Dec. 28, 2016. The contents of the referenced patent applications are incorporated in the present application by reference in their entirety.

BACKGROUND OF THE INVENTION

A. Field of the Invention

The present invention relates generally to the field of solvent recovery from a gas. More particularly, it concerns a method for removing solvent from a solvent containing sweep gas stream obtained from a fertilizer coating process. The method includes directly contacting the solvent containing sweep gas stream with an aqueous composition to condense solvent out of the sweep gas and into the aqueous composition.

B. Description of Related Art

Coating of materials for various solid fertilizer applications typically involves dissolving a coating material in a solvent to form a coating mixture and then spraying the coating mixture onto the fertilizer particles while they are being agitated. The solvent is evaporated from the coating mixture to solidify the coating material onto the particles. In a conventional coating apparatus, evaporation of the solvent and drying of the coated particles is performed via moving heated sweep gas through a container, bed, or tray of the coated particles while they are being agitated. Use of heated sweep gas for drying the coated particles typically requires a large amount of energy to move the sweep gas and heat the sweep gas to a temperature sufficient to evaporate the solvent and maintain the temperature of the coating apparatus. The heated sweep gas often causes pre-drying of the coating material before it contacts the material to be coated. This can make spraying the coating mixture challenging and costly by reducing the quality of the resulting coating, wasting coating material, and/or clogging the coating material sprayers.

The heated sweep gas exiting the coating apparatus is enriched with the solvent. In an effort to reuse the sweep gas and/or solvent, the solvent is typically separated from the sweep gas either by condensation or adsorption techniques. Conventional condensation processes use condenser units that are designed such that the heated sweep gas contacts the outer surface of a structure (e.g., multiple tubes) that encloses a circulating fluid (e.g., water) having a lower temperature than the heated sweep gas (See, for example, CN105110951 to Ye). The heated sweep gas, which does not come into direct contact with the circulating fluid, begins to cool when it contacts the outer surface of the structure, thereby resulting in condensation of the solvent from the sweep gas. The use of these condensers can increase the costs and complexity of the overall process of removing solvent from heated sweep gas.

Adsorption techniques also introduce their own complexities and costs. By way of example, the equipment and energy required to adsorb and recover the solvent from a solid surface can increase the costs and complexity of the overall solvent recovery process. An example of such an adsorption process is illustrated in CN204699562 to Cao et al., which utilizes activated coal to adsorb the solvent.

Due, at least in part, to the aforementioned complexities, another approach has been taken where the solvent containing sweep gas is simply collected and discarded or incinerated. While this approach may reduce the costs and complexities of the overall fertilizer coating process, it is oftentimes viewed as wasteful and potentially harmful to the environment.

SUMMARY OF THE INVENTION

A solution has been discovered to the aforementioned problems associated with recovering solvent from a solvent containing sweep gas. The solution is premised on directly contacting a solvent-enriched sweep gas (e.g., a solvent-enriched sweep gas obtained from a fertilizer coating process) with an aqueous composition to condense the solvent directly into the aqueous composition. The condensed solvent can then be removed from the aqueous composition (e.g., by contacting the aqueous composition with steam to evaporate the solvent from the composition and/or by using gravity separation techniques when the condensed solvent and aqueous composition have different densities and/or are immiscible with one another). The recovered sweep gas, the recovered solvent, and the recovered aqueous composition can each then be recycled and used again in the processes of the present invention. Non-limiting benefits associated with the processes of the present invention include any one of: (1) recovering solvent in a more economical and efficient manner without the use of a traditional condensing unit that utilizes circulating fluid to condense the solvent or without the use of solid surface adsorption techniques; (2) lessening the environmental impact associated with releasing solvent into the environment or incinerating solvent; and/or (3) reducing the need for additional solvent and sweep gas to be used in coating processes such as fertilizer coating processes.

In one aspect of the present invention there is disclosed a method for removing solvent from a solvent containing sweep gas stream obtained from a fertilizer coating process. The method can include: (a) directly contacting the solvent containing sweep gas stream with an aqueous composition comprising 50% wt/wt (weight/weight) to 100% wt/wt of water; (b) condensing at least a portion of the solvent out of the solvent containing sweep gas stream into the aqueous composition to produce a solvent-enriched aqueous composition and a recovered sweep gas stream; and (c) removing the recovered sweep gas stream from the solvent-enriched aqueous composition. The method can further include separating at least a portion of the solvent from the solvent-enriched aqueous composition to produce a recovered solvent and a recovered aqueous composition. In one aspect, the method can include recycling at least a portion of (i) the recovered sweep gas as sweep gas in the fertilizer coating process; (ii) the recovered aqueous composition for use in the aqueous composition in step (a); and/or (iii) the recovered solvent as solvent in the fertilizer coating process. The separation process can be performed by contacting the solvent-enriched aqueous composition with steam such that the heat from the steam evaporates the solvent from the aqueous composition. The evaporated solvent can then be collected and recycled or used in an entirely new coating process. In another aspect, the separation process can be performed via gravity separation in instances where the solvent and the aqueous composition have different densities and/or are substantially immiscible in one another. In instances where the recovered solvent still includes water, then the water can be further removed by physisorption (e.g., use of molecular sieves) or chemisorption (e.g., by use of salts such as sodium sulfate), or a combination thereof.

Also disclosed in the context of the present invention is a fertilizer coating process that produces the solvent containing sweep gas and/or can use any one or more of the recovered sweep gas, the recovered solvent, and the recovered aqueous composition in the fertilizer coating process. The fertilizer coating process can include: (i) contacting fertilizer particles with a liquid composition comprising a coating material and the solvent (e.g., a coating mixture) in an interior volume of a coating apparatus or container having a side wall to obtain coated fertilizer particles; (ii) evaporating the solvent from the coated fertilizer particles by heating the coated fertilizer particles; and (iii) removing the evaporated solvent from the interior volume of the coating container with the sweep gas to produce the solvent containing sweep gas stream. The sweep gas can be heated to a temperature below, at, or above the evaporation temperature of the solvent. In certain instances, the coated fertilizer particles can be heated with any one of, any combination of, or all of the following, to evaporate the solvent from the coating material: (a) heated sweep gas; (b) electromagnetic radiation (e.g., ultraviolet radiation, infrared radiation, or a combination thereof) to evaporate the solvent by heating the coated fertilizer particles directly or indirectly (e.g., heating the container and/or an internal container containing the coated fertilizer particles); (c) heat generated from an external heat source that is positioned outside of the interior volume of the coating container and is configured to externally heat a portion of the side wall of the coating container and/or internal container to evaporate the solvent; and/or (d) heat generated from a heat source configured to heat an internal container for uncoated fertilizer particles and/or the coated fertilizer particles, wherein the internal container is comprised in the interior volume of the coating container.

In yet another aspect of the present invention, a sweep gas recovery apparatus is described. The sweep gas recovery apparatus can be part of a larger system that also includes a coating apparatus and/or an aqueous composition/solvent recovery apparatus. Each of these apparatuses of the system can be coupled to one another (e.g., they can be in fluid communication with one another such as through various inlets, outlets, and/or valves). By way of example, solvent-enriched sweep gas can be directed from the coating container to the sweep gas recovery apparatus, which can separate sweep gas from the solvent via an aqueous solution. The solvent in the aqueous solution can then be directed to the aqueous composition/solvent recovery apparatus to separate the solvent from the aqueous composition. Non-limiting examples of various features that each of the coating container, sweep gas recovery apparatus, and aqueous composition/solvent recovery apparatus can have are provided in the description of illustrative embodiments section and/or in FIGS. 1-7. With respect to the sweep gas recovery apparatus, it can include (i) an inlet for a solvent-enriched sweep gas to enter the interior volume of the sweep gas recovery apparatus, (ii) an inlet for an aqueous composition to enter the interior volume of the sweep gas recovery apparatus, (iii) a solvent-enriched sweep gas distributor (e.g., pack bed and/or nozzle(s) that can be configured to increase the surface volume of the solvent-enriched sweep gas that directly contacts the aqueous composition), (iv) an outlet that can be configured to remove recovered sweep gas from the sweep gas recovery apparatus, and (v) an outlet that can be configured to remove a solvent-enriched aqueous composition from the sweep gas recovery apparatus. With respect to the aqueous composition/solvent recovery apparatus ("A/S apparatus"), it can include (i) an inlet for a solvent-enriched aqueous composition to enter the interior volume of the A/S apparatus, (ii) and inlet for steam to enter the interior volume of the A/S apparatus, (iii) a steam distributor (e.g., pack bed and/or nozzle(s) that can be configured to increase the surface volume of the steam that contacts the solvent-enriched aqueous composition), (iv) an outlet that can be configured to remove recovered aqueous composition from the A/S apparatus, and (v) an outlet that can be configured to remove recovered solvent from the A/S apparatus. In instances where the solvent and aqueous composition have different densities and/or are not miscible with one another, the A/S apparatus may not include a steam distributor, as the solvent and aqueous composition can be separated by gravity separation techniques. Turning to the coating apparatus, it can include (i) an inlet for sweep gas to enter the interior volume of the coating container, (ii) a coating applicator (e.g., nozzle(s) that can be configured to apply coating to a material such as fertilizer particles), (iii) a heating source that can be configured to evaporate solvent from the coated material, and (iv) an outlet that can be configured to remove solvent-enriched sweep gas from the coating container. The heating source can be any of those discussed above and throughout this specification.

In a particular aspect of the invention, 20 embodiments are described. Embodiment 1 is a method for removing solvent from a solvent containing sweep gas stream obtained from a fertilizer coating process, the method comprising: (a) directly contacting the solvent containing sweep gas stream with an aqueous composition comprising 50% wt/wt to 100% wt/wt of water; (b) condensing at least a portion of the solvent out of the solvent containing sweep gas stream into the aqueous composition to produce a solvent-enriched aqueous composition and a recovered sweep gas stream; and (c) removing the recovered sweep gas stream from the solvent-enriched aqueous composition. Embodiment 2 is the method of embodiment 1, further comprising separating at least a portion of the solvent from the solvent-enriched aqueous composition to produce a recovered solvent and a recovered aqueous composition. Embodiment 3 is the method of embodiment 2, further comprising recycling at least a portion of: (i) the recovered sweep gas as sweep gas in the fertilizer coating process; (ii) the recovered aqueous composition for use in the aqueous composition in step (a); and/or (iii) the recovered solvent as solvent in the fertilizer coating process. Embodiment 4 is the method of any one of embodiments 2 to 3, wherein separating at least a portion of the solvent from the solvent-enriched aqueous composition comprises contacting the solvent-enriched aqueous composition with steam. Embodiment 5 is the method of any of embodiments 2 to 3, wherein separating at least a portion of the solvent from the solvent-enriched aqueous composition comprises gravity separation. Embodiment 6 is the method of any of embodiments 2 to 5, wherein all or a part of any remaining water in the recovered solvent is further removed from the recovered solvent. Embodiment 7 is the method of embodiment 6, wherein all or a part of any remaining water is removed by physisorption or chemisorption, or a combination thereof. Embodiment 8 is the method of any of embodiments 1 to 7, wherein the solvent in the solvent containing sweep gas stream is an organic solvent. Embodiment 9 is the method of embodiment 8, wherein the organic solvent comprises chloroform, toluene, methylene chloride, acetonitrile, 1,1,2-trichloroethane, dichlorobenzene, or methylethyl ketone, or any mixture or blend thereof. Embodiment 10 is the method of any of embodiments 1 to 9, wherein the sweep gas in the solvent containing sweep gas stream comprises carbon dioxide ($CO_2$), flue gas, or air, or any combination thereof. Embodiment 11 is the method of any one of embodiments 1 to 10, wherein the temperature of the aqueous composition in step (a) is 4° C. to 50° C. Embodiment 12 is the method of any one of embodiments 1 to 11, wherein the flow rate of the solvent containing sweep gas stream in step (a) is 0.5 to 2.5 MT sweep gas/MT of a fertilizer to be coated. Embodiment 13 is the method of embodiment 12, wherein the temperature and pressure of the solvent containing sweep gas stream in step (a) are 40° C. to 150° C. and 0.5 to 3 atmospheres (0.05 MPa to 0.3 MPa), preferably 1 atmosphere (0.101 MPa), respectively. Embodiment 14 is the method of any one of embodiments 1 to 13, wherein the fertilizer coating process used to obtain the solvent containing sweep gas stream comprises: (i) contacting fertilizer particles with a liquid composition comprising a coating material and the solvent in an interior volume of a coating container having a side wall to obtain coated fertilizer particles; (ii) evaporating the solvent from the coated fertilizer particles by heating the coated fertilizer particles; and (iii) removing the evaporated solvent from the interior volume of the coating container with the sweep gas to produce the solvent containing sweep gas stream. Embodiment 15 is the method of embodiment 14, wherein the sweep gas is heated and wherein the solvent is evaporated from the coated fertilizer particles by contacting the particles with the heated sweep gas. Embodiment 16 is the method of any one of embodiments 14 to 15, wherein the coated fertilizer particles are heated: (a) with electromagnetic radiation to evaporate the solvent by heating the particles directly and/or heating the particles indirectly through heating the coating container and/or an internal container therein containing the fertilizer particles and/or the coated fertilizer particles, wherein the internal container is comprised in the interior volume of the coating container; (b) with heat generated from an external heat source that is positioned outside of the interior volume of the coating container and is configured to externally heat a portion of the side wall of the coating container and/or internal container to evaporate the solvent; and/or (c) with heat generated from a heat source internal to the coating container and configured to heat the internal container. Embodiment 17 is the method of embodiment 16, wherein the coated fertilizer particles are heated with electromagnetic radiation to evaporate the solvent, the electromagnetic radiation comprising or consisting of ultraviolet radiation or infrared radiation, or a combination thereof. Embodiment 18 is the method of any one of embodiments 16 to 17, wherein an electromagnetic radiation source is positioned downstream from where the liquid composition contacts the fertilizer particles in step (i). Embodiment 19 is the method of any one of embodiments 14 to 18, wherein the coated fertilizer particles are heated with heat generated from the external heat source that is positioned outside of the interior volume of the coating container to evaporate the solvent and wherein the external heat source is positioned downstream from where the liquid composition contacts the fertilizer particles in step (i). Embodiment 20 is the method of any one of embodiments 14 to 19, wherein the coated fertilizer particles are heated with heat generated from a heat source configured to heat an internal container for the coated fertilizer particles, wherein the internal container is comprised in the interior volume of the coating container and external to the internal container, and wherein the heat source is positioned downstream from where the liquid composition contacts the fertilizer particles in step (i).

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea such as urea particles.

The terms "particulate" or "particle" are defined as an unconnected object that has a volume and mass. The volume can be defined or limited in size, such as a maximum, mean, median, minimum, etc. diameter, circumference, radius, volume, surface area, etc. In some embodiments herein, a "particulate" or "particle" is a solid or a liquid.

The term "powder" is defined as a dry matter made of solid particles.

The term "aqueous composition" is defined as a liquid composition that contains water. In some instances, the aqueous composition contains 50% or more water by volume, moles, mass, and/or weight.

The terms "directly contact" or "direct contact" are defined as a physical contact between the materials in contact. In some instances, direct contact can include a physical mixing of the materials.

"Solvent containing" or "solvent-enriched" are used interchangeably herein.

The use of the words "a" or "an" when used in conjunction with the term "comprising," "including," "containing," or "having" in the claims or the specification may mean "one," but it is also consistent with the meaning of "one or more," "at least one," and "one or more than one."

The terms "about" or "approximately" are defined as being close to as understood by one of ordinary skill in the art. In one non-limiting embodiment the terms are defined to be within 10%, preferably within 5%, more preferably within 1%, and most preferably within 0.5%.

The terms "wt. %", "vol. %" or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "reducing" or any variation of this term, when used herein includes any measurable decrease or complete reduction to achieve a desired result.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. With respect to the transitional phrase "consisting essentially of," in one non-limiting aspect, a basic and novel characteristic of the systems and methods of the present invention are their abilities to recover solvent from a gas.

The methods, apparatuses, and systems of the present invention can "comprise," "consist essentially of," or "consist of" particular steps, components, compositions, etc., disclosed throughout the specification.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The following drawings form part of the present specification and are included to further demonstrate certain non-limiting aspects of the present invention. The invention may be better understood by reference to one or more of these drawings in combination with the detailed description of specific embodiments presented herein.

Figure 1A:
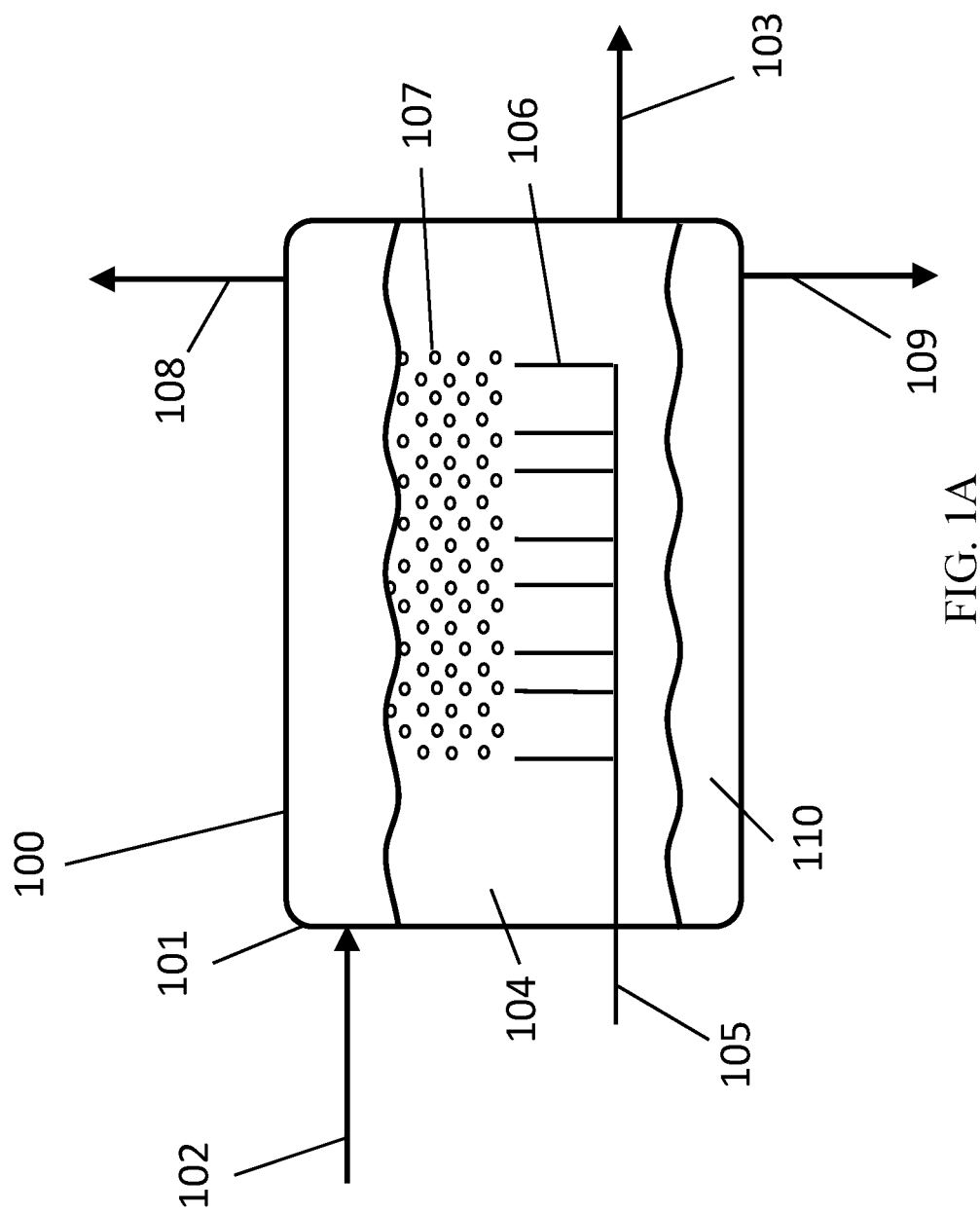
FIG. 1A is a schematic of a system for condensing solvent out of a solvent-enriched sweep gas and recovering the sweep gas using an aqueous composition, according to embodiments of the invention.

While the invention is susceptible to various modifications and alternative forms, specific embodiments thereof are shown by way of example in the drawings and may herein be described in detail. The drawings may not be to scale.

DESCRIPTION OF ILLUSTRATIVE EMBODIMENTS

A solution to the aforementioned problems associated with recovering solvent from a solvent containing sweep gas obtained from a fertilizer coating process has been discovered. The solution is premised on directly contacting a solvent-enriched sweep gas (e.g., a solvent-enriched sweep gas obtained from a fertilizer coating process) with an aqueous composition to condense the solvent directly into the aqueous composition. The condensed solvent can then be removed from the aqueous composition. The recovered sweep gas, the recovered solvent, and the recovered aqueous composition can each be recycled and used again in any of the processes of the present invention.

These and other non-limiting aspects of the present invention are provided in more detail in the following sections.

A. Process to Recover a Sweep Gas and Obtain an Aqueous-Enriched Solvent Composition The systems, apparatuses, and methods disclosed herein can recover and/or recycle a sweep gas from a solvent-enriched sweep gas, obtain a solvent from a solvent-enriched sweep gas, and/or obtain an aqueous-enriched solvent composition. Embodiments include the use of an aqueous composition to recover and/or recycle a sweep gas from a solvent-enriched sweep gas. The solvent-enriched sweep gas can be directly contacted by the aqueous composition to condense and/or precipitate solvent out of the solvent-enriched sweep gas to form a recovered sweep gas. In some embodiments, some or all of the solvent from the solvent-enriched sweep gas can be condensed to form a solution that contains more water than solvent, a solvent-enriched aqueous composition. In some embodiments, some or all of the solvent from the solvent-enriched sweep gas can be condensed to form a solution that contains more solvent than water, an aqueous-enriched solvent composition. In some embodiments, some solvent can remain in a solvent-enriched aqueous composition and some solvent can separate out of the solvent-enriched aqueous composition as an aqueous-enriched solvent composition. In some embodiments, a solvent-enriched aqueous composition and an aqueous-enriched solvent composition are both formed. In some instances, the solvent-enriched sweep gas is directly contacted by the aqueous composition by using a packed bed and/or column, by bubbling the solvent-enriched sweep gas through the aqueous composition, by spraying the aqueous composition through the solvent-enriched sweep gas, by combining both the solvent-enriched sweep gas and the aqueous composition in a porous matrix, etc., or any combination thereof.

1. Aqueous Composition

In embodiments of the invention, the aqueous composition contains 1% to 100% volume/volume (v/v) or weight/weight (wt/wt) of water. In some instances, the amount of water in the aqueous composition is 100%, 95%, 90%, 85%, 80%, 75%, 70%, 65%, 60%, 55%, 50%, 45%, 40%, 35%, 30%, 25%, 20%, 15%, 10%, 5%, 1%, less than 1% by weight or volume or any range therein. In some embodiments the aqueous composition contains 50% to 100% of water by weight or any range therein. The amount of the water in the aqueous composition can vary depending on the conditions, solvents, and/or requirements of the process in which it is being used.

In embodiments of the invention, the aqueous composition is a temperature suitable to directly condense solvent out of a solvent containing sweep gas. In some instances, the aqueous composition is at a temperature of 4° C. to 50° C. when it contacts the solvent containing sweep gas. In some instances, the solvent containing sweep gas has a temperature of greater than 50° C., is 50° C., 45° C., 40° C., 35° C., 30° C., 25° C., 20° C., 15° C., 10° C., 9° C., 8° C., 7° C., 6° C., 5° C., 4° C., is below 4° C., or is any temperature or range therein. The temperature of the aqueous composition can vary depending on the conditions, solvents, and/or requirements of the process in which it is being used.

2. Solvent

In embodiments of the invention, the solvent can be an organic or inorganic, polar or non-polar, and/or miscible or non-miscible in water. The solvent can be a mixture of solvents. In some instances the solvent is chloroform, toluene, methylene chloride, acetonitrile, chlorobenzene, 1,1,2-trichloroethane, dichlorobenzene, methylethyl ketone, or any mixture or blend thereof. In some instances, recovered solvent and/or aqueous-enriched solvent composition produced from recovery of solvent from a solvent-enriched sweep gas can replace all or part of the solvent entering a coating process, such as a fertilizer coating process.

3. Sweep Gas

The sweep gas used in the systems, apparatuses, and methods disclosed herein to carry a solvent away that has been evaporated from a coated material (e.g., coated fertilizer) can be any sweep gas. In some instances, the sweep gas can be any inert gas or non-inert gas capable of carrying a solvent. In some aspects, the sweep gas is a sweep gas produced by a process for coating a fertilizer. In some aspects the sweep gas contains nitrogen ($N_2$), argon (Ar), helium (He), carbon dioxide ($CO_2$), oxygen ($O_2$), air, flue gas, or any mixture or blend thereof. Flue gas can be from another part of the same plant or another plant. The flue gas can contain $CO_2$, $N_2$, and $O_2$, or any mixture or blend thereof. In some instances, recovered sweep gas can replace all or part of the sweep gas entering a coating process, such as a fertilizer coating process. The recovered sweep gas can be produced by any of the methods, apparatuses, or systems described herein.

In some instances, the sweep gas is used to carry and/or evaporate a solvent away from a coated material or material that is being dried. In some instances, the process to produce a coated material is a process described herein. In some instances, the amount of sweep gas used in the coating process and/or the process to recover the sweep gas is 0.5 MT of sweep gas/(hr×MT of material to be coated) to 2.5 MT of sweep gas/(hr×MT of material to be coated). In some instances, the amount of the sweep gas is any amount within that range, for example, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, or 0.5 MT/(hr×MT of material to be coated) or any range therein. The flow of the sweep gas can vary depending on the conditions, solvents, material to be coated, and/or requirements of the process in which it is being used.

In some aspects, an advantage of the apparatuses and processes described herein is the use of a reduced amount of fresh and/or recovered sweep gas compared to that used in conventional processes. In some instances, using a reduced amount of fresh and/or recovered sweep gas increases the effective concentration of the solvent in the sweep gas in comparison to the effective concentration of the solvent in sweep gas used in conventional processes. In some instances, the increased amount of solvent in the sweep gas enables the solvent to be more easily condensed out of the sweep gas.

The temperature of the solvent-enriched sweep gas before and/or during contact with the aqueous composition can be a temperature sufficient to carry solvent. In some instances, the temperature can be in the range of 40° C. to 130° C. In some instances, the temperature can be in the range of 40° C. to 150° C. In some instances, the temperature of the sweep gas is more than 150° C., is 150° C., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., is less than 40° C. or is any range or temperature therein. The temperature of the solvent-enriched sweep gas can vary depending on the conditions, solvents, and/or requirements of the process in which it is being used. In some instances, the temperature of the sweep gas is sufficient to heat a coating apparatus and/or system to a temperature within the range of 40° C. to 150° C. In some instances, the temperature of the sweep gas is sufficient to heat a coating apparatus and/or system to a temperature within the range of 40° C. to 130° C. In some instances, the temperature of the sweep gas is suitable for one or more solvents. In some instances, the temperature of the sweep gas is suitable for coating a fertilizer. In some instances, the fertilizer is urea. In some instances, the fertilizer is urea and the temperature of the sweep gas is sufficient to heat a coating apparatus and/or system to a temperature within the range of 40° C. to 130° C. or any range therein.

The pressure of the solvent-enriched sweep gas before and/or during contact with the aqueous composition can be a pressure sufficient to carry and/or condense the solvent. In some instances, the pressure can be in the range of 0.5 to 3 atmospheres (atm) (0.05 MPa to 0.3 MPa) In some instances, the pressure can be atmospheric pressure. In some instances, the pressure of the sweep gas is more than 3 atm, is 3 atm, 2.5 atm, 2.0 atm, 1.5 atm, 1.4 atm, 1.3 atm, 1.2 atm, 1.1 atm, 1.0 atm, 0.9 atm, 0.8 atm, 0.7 atm, 0.6 atm, 0.5 atm, is less than 0.5 atm or is any range or pressure therein. The pressure of the solvent-enriched sweep gas can vary depending on the conditions, solvents, and/or requirements of the process in which it is being used.

Figure 1B:
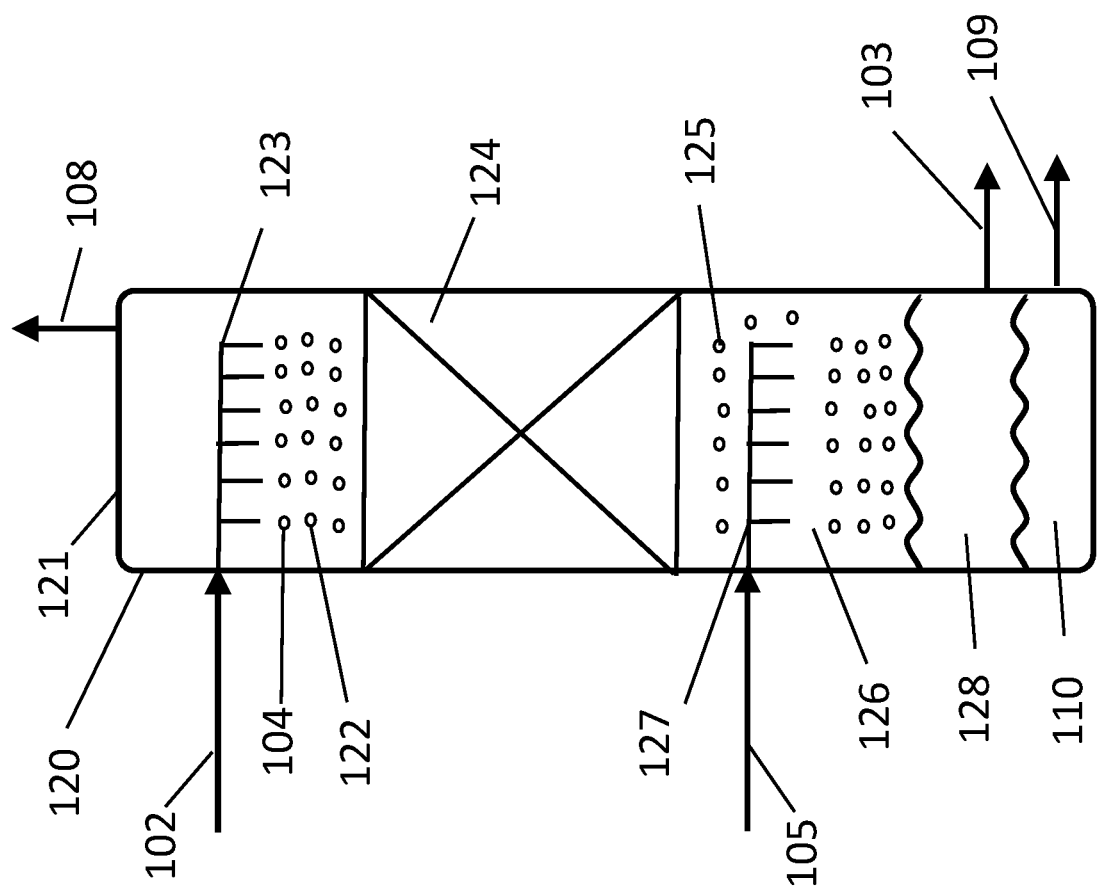
FIG. 1B is a schematic of a system for condensing solvent out of a solvent-enriched sweep gas and recovering the sweep gas using an aqueous composition, according to embodiments of the invention.

B. Apparatus to Recover a Sweep Gas and Obtain an Aqueous-Enriched Solvent Composition Apparatuses are described herein that are capable of removing solvent from a solvent-enriched sweep gas. FIG. 1A and FIG. 1B show a non-limiting schematic of sweep gas recovery apparatuses 100 and 120, respectively, for removing solvent from a solvent-enriched sweep gas using an aqueous composition 104 to form a solvent-enriched aqueous composition and a recovered sweep gas that has a reduced amount of solvent contained therein compared to the solvent-enriched sweep gas. In some embodiments, apparatuses 100 and 120 may produce an aqueous-enriched solvent composition 110. The materials of construction, size, and shape of the sweep gas recovery apparatuses 100 and 120 can be determined using standard engineering practice and/or modeling programs to achieve the maximum flow rates and appropriate contact time. The sweep gas recovery apparatuses 100 and 120 can include containers 101 and 121, respectively. Containers 101 and 121 may include solvent-enriched sweep gas inlet 105, recovered sweep gas outlet 108. Containers 101 and 121 may be adapted to allow sweep gas 107 to flow from solvent-enriched sweep gas inlet 105 to recovered sweep gas outlet 108. Aqueous composition 104 can be introduced through aqueous composition inlet 102 and solvent-enriched aqueous composition and aqueous-enriched solvent composition can be removed from the sweep gas recovery apparatuses 100 and 120 by solvent-enriched aqueous composition outlet 103 and aqueous-enriched solvent composition outlet 109, respectively. The aqueous-enriched solvent composition 110 may form above or below the solvent-enriched aqueous composition depending on the density of the compositions. Thus, in some embodiments, the location of the solvent-enriched aqueous composition outlet 103 is below the and aqueous-enriched solvent composition outlet 109.

Sweep gas recovery apparatus 100 (FIG. 1A) is configured to directly contact the solvent-enriched sweep gas with aqueous composition 104. In some embodiments, the solvent-enriched sweep gas can be distributed into aqueous composition by bubblers 106 to create bubbles of sweep gas 107 to increase the surface area of the sweep gas exposed to the aqueous composition 104. In some instances, bubblers 106 are not used. In some instances, the solvent-enriched sweep gas is directly contacted by the aqueous composition in a packed bed, a packed column, a porous matrix, etc.

Sweep gas recovery apparatus 120 (FIG. 1B) is configured to contact the aqueous composition 104 with solvent-enriched sweep gas 126. In some instances, the solvent-enriched sweep gas 126 is the continuous phase in the container 121, and is distributed in the container by solvent-enriched gas distributor 127. In some embodiments, the aqueous composition 104 can be distributed into solvent-enriched sweep gas by aqueous sprayer 123 to form aqueous droplets 122. In some instances, the contact between the solvent-enriched sweep gas 126 and the aqueous composition 104 is increased by passing the solvent-enriched sweep gas 126 and the aqueous composition 104 through a packed bed 124. In some instances, the contact between the solvent-enriched sweep gas 126 and the aqueous composition 104 forms solvent-enriched aqueous droplets 125, which, in some embodiments, may combine to form a collectable reservoir of solvent-enriched aqueous composition 128. In some embodiments an aqueous-enriched solvent composition 110 may also form.

In some instances, the solvent-enriched sweep gas can be received directly from other processes, such as, but not limited to, any one of the coating and/or drying processes described herein, such as that shown in FIG. 3, FIG. 4, FIG. 5, FIG. 6, and FIG. 7. In some instances, the recovered sweep gas is used as all or part of a gas used in another process, such as a coating and/or drying process using apparatus such as that shown in FIG. 3, FIG. 4, FIG. 5, FIG. 6, and FIG. 7. In some embodiments, the solvent-enriched aqueous composition is further processed to reduce the amount of solvent therein to form a recovered aqueous composition (see FIG. 2A and FIG. 2B, which are discussed in more detail below). In some instances, at least a portion of the recovered sweep gas is used in other processes in the same or a different plant, such as a fertilizer coating process. In some embodiments, the aqueous-enriched solvent composition can be further processed to reduce the amount of water in the solvent to form a recovered solvent. In some instances, at least a portion of the aqueous-enriched solvent composition and/or recovered solvent is used in other processes in the same or a different plant, such as use in a fertilizer coating process.

C. Process to Recover an Aqueous Composition and/or Recover Solvent

Methods to recover and/or recycle a solvent and/or an aqueous composition from a solvent-enriched aqueous composition are described herein. The systems, apparatuses, and methods disclosed herein can recover and/or recycle a solvent and/or an aqueous composition from a solvent-enriched aqueous composition.

Some embodiments include use of steam to recover a solvent ("recovered solvent") and/or recover an aqueous composition ("recovered aqueous composition") from a solvent-enriched aqueous composition. In some instances, the steam contacts the solvent-enriched aqueous composition to transform the dissolved and/or carried solvent in the solvent-enriched aqueous composition into a gas separable from the aqueous composition. The solvent-enriched aqueous composition can be contacted by steam by any means known in the art, such as, but not limited to, combining in a packed bed and/or packed column, bubbling the steam through the solvent-enriched aqueous composition, spraying a solvent-enriched aqueous composition through the steam, and/or combining both the solvent-enriched aqueous composition and the steam in a porous matrix and/or packed bed. In some instances, the solvent can be separated through gravity separation, such as in instances where the solvent and the aqueous composition have different densities and/or are immiscible with one another. In some instances, the amount of water in the recovered solvent is further reduced by any means known in the art, such as, but not limited to, physisorption and/or chemisorption. In some instances, the water is reduced in the recovered solvent by use of a molecular sieve and/or by the use of a chemical such as, but not limited to, sodium sulfate. In some instances, the solvent mixed with the exiting steam is recovered by any means known in the art, such as, but not limited to, condensation and/or phase separation to produce a recovered solvent, an aqueous-enriched solvent composition, an aqueous composition, and/or a solvent-enriched aqueous composition.

In some aspects of methods described herein, materials used in the processes, for example, solvents and aqueous solution that is used to capture the solvent, are recycled for reuse in the method. All or part of the materials used in the processes described herein can be recycled materials. For example, in some instances, at least a portion of the recovered aqueous composition and/or solvent-enriched aqueous composition is used in other processes in the same or a different plant. In some instances, at least a portion of the recovered solvent and/or aqueous-enriched solvent composition is used to produce a coating mixture comprising coating material and the solvent. In some instances, at least a portion of the recovered solvent and/or aqueous-enriched solvent composition is used in other processes in the same or a different plant.

D. Apparatus to Recover Solvent and/or Recover an Aqueous Composition

Figure 2A:
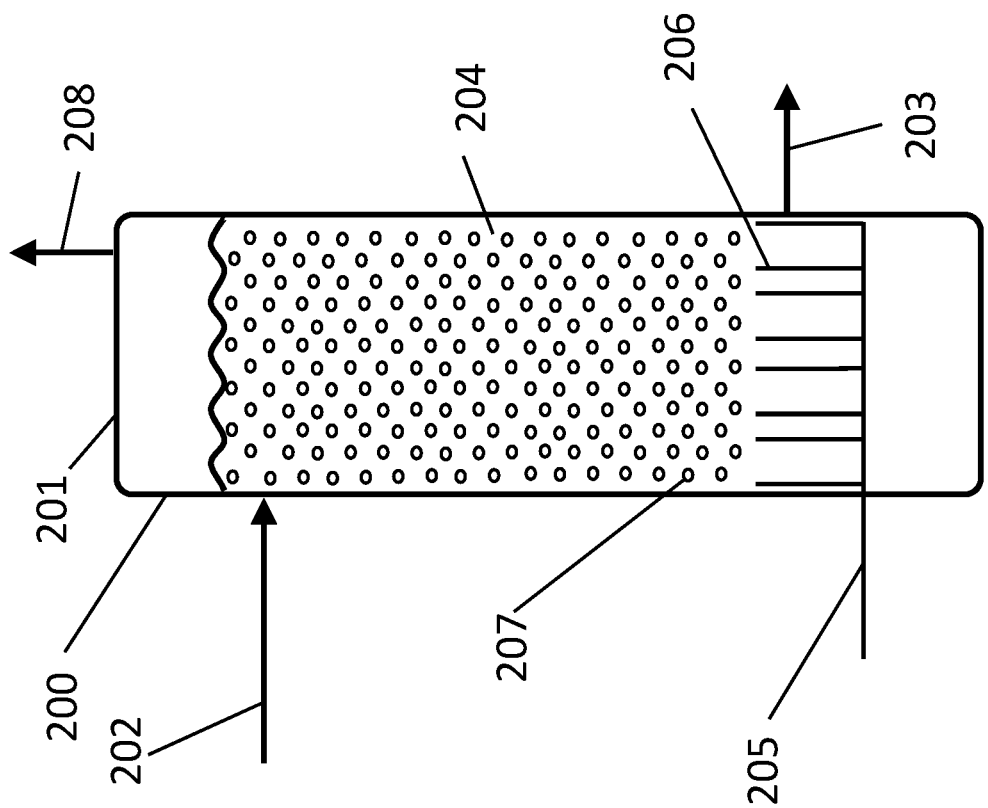
FIG. 2A is a schematic of a system for using steam to recover a solvent from a solvent containing aqueous composition, according to embodiments of the invention.
Figure 2B:
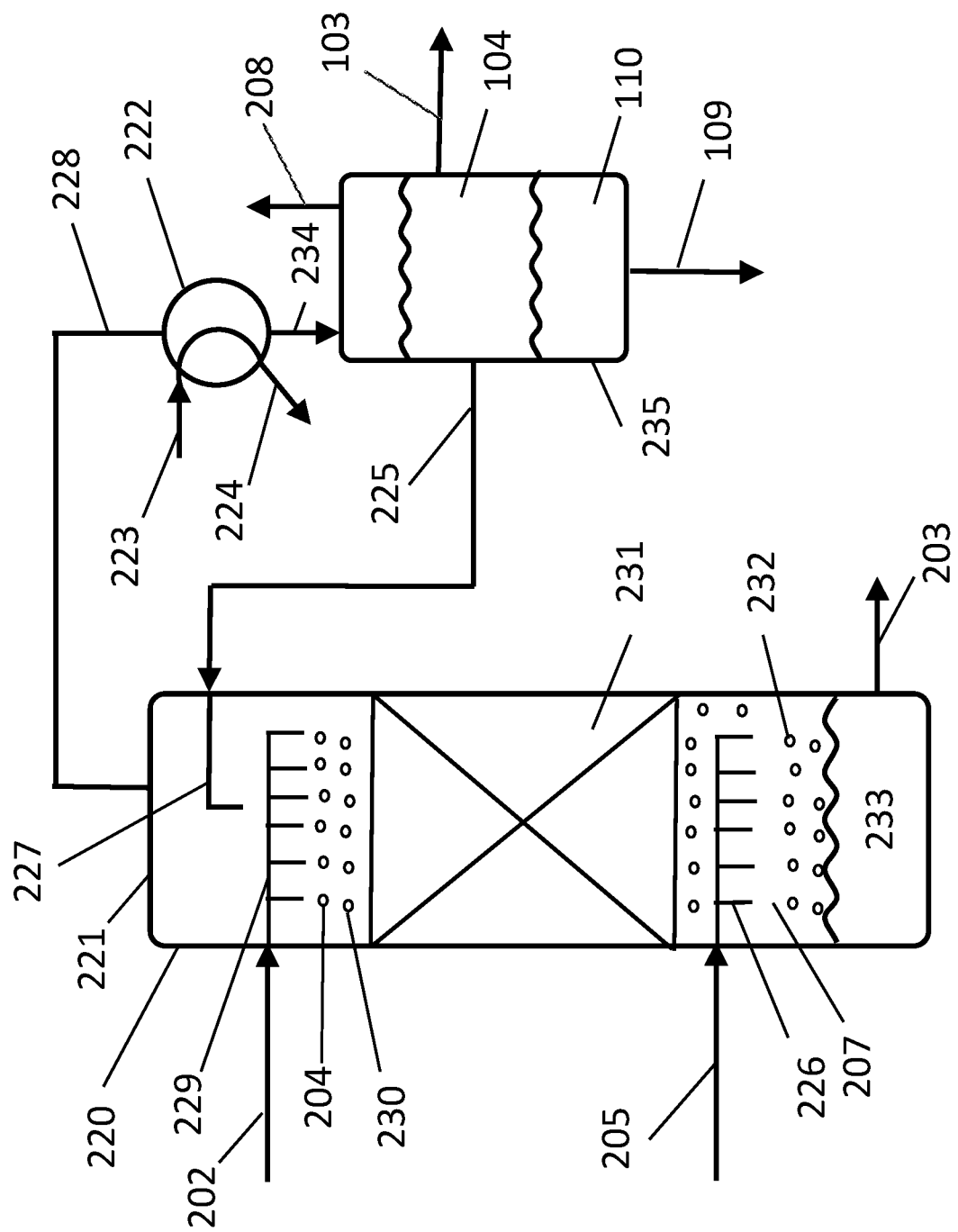
FIG. 2B is a schematic of a system for using steam to recover a solvent from a solvent containing aqueous composition, according to embodiments of the invention.

Apparatuses are described herein that are capable of removing solvent from a solvent-enriched aqueous composition. FIG. 2A and FIG. 2B are non-limiting schematics of aqueous composition recovery and/or solvent recovery apparatuses ("A/S recovery apparatus") 200 and 220, respectively, for removing solvent from solvent-enriched aqueous composition 204 using steam 207 to form a recovered aqueous composition that has a reduced amount of solvent contained therein, an aqueous-enriched solvent composition, and/or recovered solvent that has a reduced amount of water contained therein. The materials of construction, size, and shape of A/S recovery apparatuses 200 and 220 can be determined using standard engineering practice and/or modeling programs to achieve the maximum flow rates and appropriate contact time. A/S recovery apparatuses 200 and 220 can include containers 201 and 221, respectively. Containers 201 and 221 may include solvent-enriched aqueous composition inlet 202, recovered aqueous composition outlet 203, and are capable of having solvent-enriched aqueous composition 204 move from solvent-enriched aqueous composition inlet 202 to the recovered aqueous composition outlet 203, for example, by flow due to gravity. Steam 207 can be introduced through steam inlet 205 and recovered solvent and/or a mixture of vaporous solvent and steam can be removed from A/S recovery containers 201 and 221 through recovered solvent outlet 208 or overhead line 228. Recovered solvent can be removed from A/S recovery apparatuses 200 and 220 through recovered solvent outlet 208.

A/S recovery apparatus 200 (FIG. 2A) may be configured to contact solvent-enriched aqueous composition 204 with steam 207. In some embodiments, steam 207 can be distributed into the solvent-enriched aqueous composition by bubblers 206 to create bubbles of steam 207 to increase the surface area of solvent-enriched aqueous composition 204 exposed to steam 207. In some instances, bubblers 206 are not used. In some instances, the solvent-enriched aqueous composition is contacted by steam in a packed bed, a packed column, a porous matrix, etc.

A/S recovery apparatus 220 (FIG. 2B) may be configured to contact steam 207 with solvent-enriched aqueous composition 204. In some instances, the A/S recovery apparatus 220 is a steam stripping apparatus and container 221 is a steam stripping column. In some embodiments, steam 207 is the continuous phase in the container 221, and is distributed in the container by steam sparger 226. In some embodiments, the solvent-enriched aqueous composition can be distributed in the steam by solvent-enriched aqueous composition sprayer 229 to form solvent-enriched aqueous composition droplets 230. In some instances, the contact between the steam 207 and the solvent-enriched aqueous composition 204 is increased by passing the steam 207 and the solvent-enriched aqueous composition 204 through a packed bed 231. In some instances, the contact between the steam and the solvent-enriched aqueous composition forms solvent free aqueous composition droplets 232, which, in some embodiments, may combine to form a collectable reservoir of recovered aqueous composition 233.

To minimize solvent losses from the system, an A/S recovery apparatus may also be configured to condense and phase separate solvent from a steam/solvent mixture produced in the A/S recovery container. In some instances, A/S recovery apparatuses 200 and 220 can be configured to condense and phase separate solvent from a steam/solvent mixture (see for example FIG. 2B). In some instances, a steam/solvent mixture can be removed from a A/S recovery apparatus and moved into a condenser 222 through an overhead line 228. In some instances, the condenser 222 can condense part of or all of the solvent, part of or all of the steam, and/or part of or all of both the steam and solvent out of the steam/solvent mixture to form a condensed solvent, a condensed steam, and/or a condensed steam/solvent mixture, respectively. In some instances, the condensed solvent, the condensed steam, the condensed steam/solvent mixture, the remaining steam, the remaining gas phase solvent, and/or the remaining steam/solvent mixture can be removed from the condenser 222. The condenser 222 can be any condenser known in the art. In some instances, the condenser 222 uses a cooling liquid and/or gas to cool the steam/solvent mixture. The cooling liquid and/or gas can enter the condenser through cooling fluid inlet 223 and exit the condenser 222 through cooling fluid outlet 224. In some instances, the condenser 222 uses cooling water as a cooling liquid.

In some instances, some or all of the products produced in the condenser 222 can be removed from the condenser 222 and moved into a phase separator 235 through one or more condenser outlets, such as condenser outlet 234. In some instances, the phase separator 235 is configured to separate gasses, liquids, solvent, and/or an aqueous composition into separate phases. In some instances, the phase separator separates recovered solvent, aqueous composition 104, and/or aqueous-enriched solvent composition 110. In some instances, the recovered solvent is removed from the phase separator 235 through recovered solvent outlet 208. In some instances, aqueous composition 104 is removed from the phase separator 235 through solvent-enriched aqueous composition outlet 103. In some instances, all or part of the aqueous composition 104 is removed from the phase separator 235 through reflux line 225. In some instances, the reflux line 225 is configured to move aqueous composition 104 into a A/S recovery apparatus, such as A/S recovery apparatuses 200 and 221, to remove additional solvent from the aqueous composition. In some instances, the aqueous composition 104 is distributed in the A/S recovery apparatus through a reflux sprayer 227. In some instances, the aqueous-enriched solvent composition 110 is removed from the phase separator 235 through aqueous-enriched solvent composition outlet 109.

Figure 6:
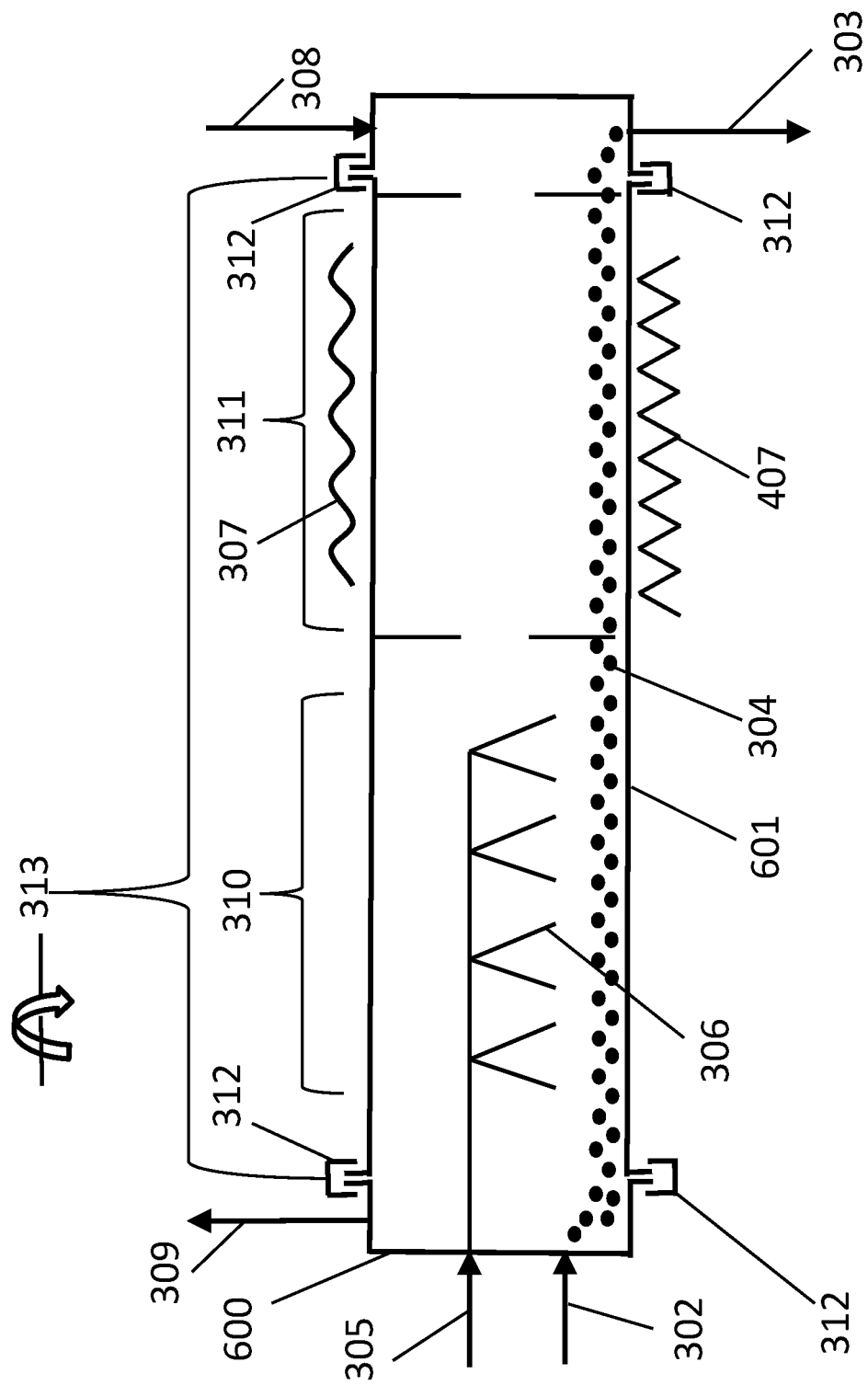
FIG. 6 is a schematic of a system for coating a material and drying the coating on the coated material using electromagnetic radiation and a heating source that heats a side wall of a coating container, according to embodiments of the invention.
Figure 7:
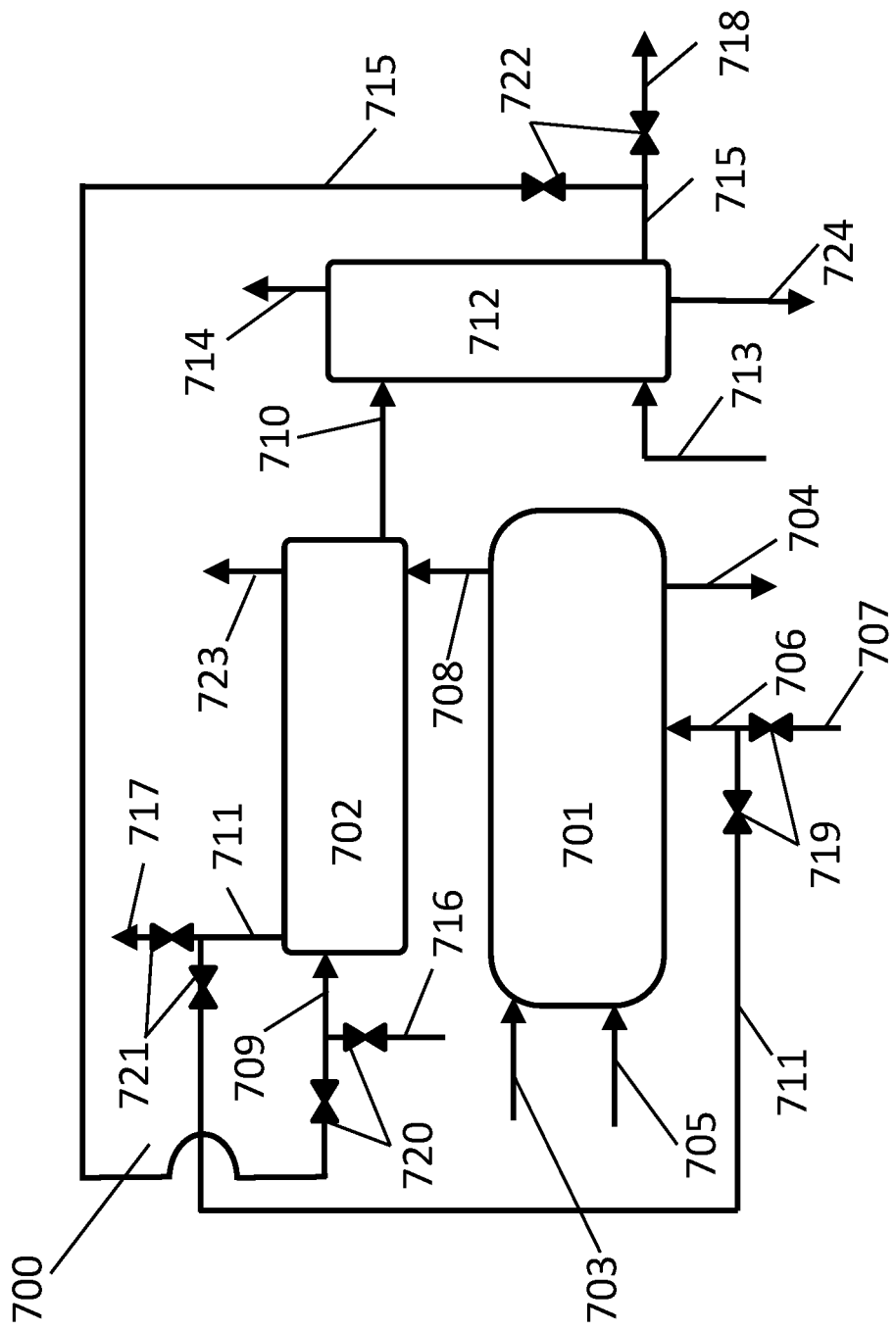
FIG. 7 is a schematic of a system for coating a material and recovering and recycling a sweep gas, a solvent, and an aqueous solution used in the coating process, according to embodiments of the invention.

In some instances, the solvent-enriched aqueous composition can be received directly from other processes, such as, but not limited to, a sweep gas recovery process implemented by, for example, apparatuses shown in FIG. 1A, FIG. 1B, and FIG. 7. In some instances, the recovered solvent, aqueous-enriched solvent composition, and/or condensed solvent are used as all or part of the solvent used in another process, such as, but not limited to, a coating and/or drying process implemented by, for example, apparatuses shown in FIG. 3, FIG. 4, FIG. 5, FIG. 6, and FIG. 7. In some embodiments, the recovered solvent, aqueous-enriched solvent composition, and/or condensed solvent is further processed to reduce the amount of water therein. In some instances, the recovered aqueous composition and/or condensed steam is used as all or part of the aqueous composition used in another process, such as, but not limited to, a sweep gas recovery apparatus (See, for example, FIG. 1A, FIG. 1B, and FIG. 7). In some embodiments, the solvent-enriched aqueous composition and/or condensed steam are processed again through the same or a separate A/S recovery apparatus.

E. Process to Coat a Material

The solvent-enriched sweep gas used in the sweep gas recovery methods, apparatuses, and systems disclosed herein can, in some preferred instances, come from a fertilizer coating process. Generally, the fertilizer coating process uses a coating apparatus or container, which is described in detail below. The process can include contacting fertilizer material (e.g., fertilizer particles) with a coating mixture that includes a coating material dissolved in a solvent. This contacting step can be performed by applying the mixture to the fertilizer material such as by spraying the fertilizer material or immersing this material into the mixture. In other instances, the fertilizer particles can be mixed with a coating material followed by application of a solvent to solubilized the coating material and coat the fertilizer particles.

Once the fertilizer material is coated, the method may include drying the fertilizer material to evaporate the solvent and thereby form a coated fertilizer material. In the context of the present invention, this drying step can be performed by using heated sweep gas. In particular, evaporation of the solvent can be performed via moving heated sweep gas through a container or internal container of the fertilizer material while the material is being agitated. In some instances, movement of the sweep gas agitates the fertilizer material. In some instances, the coating apparatus, a portion thereof, or an apparatus in the coating apparatus rotates to move and/or agitate the material to be coated and/or the coated material. As explained above, the temperature of the sweep gas can be a temperature sufficient to carry and/or evaporate the solvent from the coated fertilizer material. In some instances, the temperature is 40° C. to 150° C. or any temperature or range therein (e.g., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C.). In other instances, the temperature can be less than 40° C. In yet other instances, the temperature can be greater than 150° C. In some particular instances, the fertilizer material can be urea, and the temperature of the sweep gas can be 40° C. to 130° C. or any range therein.

One of the issues of using heated sweep gas, however, is that it typically requires a large amount of energy to move the sweep gas through the coating apparatus/container and to heat the sweep gas to a temperature sufficient to evaporate the solvent and/or to maintain the temperature of the coating apparatus/container. Further, the heated sweep gas may causes pre-drying of the coating material before it contacts the fertilizer material. This can make spraying the coating material challenging and costly by reducing the quality of the coating, wasting coating material, and/or clogging the coating material sprayers.

In addition to the solution discussed above with respect to removing solvent from a solvent containing sweep gas, the present invention also offers another solution concerning the use of heated sweep gas to evaporate the solvent from a coating mixture. The solution is premised on the use of a heat source other than heated sweep gas to evaporate the solvent from a coating mixture. This additional heat source can be any one of, or any combination of, or all of: (1) an electromagnetic radiation source positioned to evaporate solvent directly from coated materials (e.g., fertilizer material) or indirectly by heating the container and/or an internal container containing the coated materials; (2) an external heat source that is positioned outside of the interior volume of the coating container and that is configured to heat a portion of a side wall of the coating container and/or internal container to generate heat to evaporate solvent from the coated materials; and/or (3) a heat source that is positioned in the inside of the interior volume of the coating container configured to heat an internal container positioned in the internal volume of the coating container. A benefit of using any one these additional heating sources is that the sweep gas does not have to be constantly heated to a temperature that would evaporate solvent from the coated materials. Rather, the solvent could be evaporated with these additional heating sources. Without wishing to be bound by theory, it is believed these heating sources can be more energy efficient than constantly heating large volumes of sweep gas to temperatures above the evaporation temperature of the solvent. Even further, the amount of sweep gas used in the coating process can be reduced, as the sweep gas is not the sole source of heat to evaporate solvent; therefore, less sweep gas is needed to remove evaporated solvent from the coating apparatus/container.

It is believed that the use of these additional heating sources can result in a reduction in sweep gas used during a coating process than would otherwise be used if the solvent is evaporated by using heated sweep. In some instances, the amount of fresh sweep gas used can be reduced by 1% to 100%, or any percent or range therein (e.g., 40% to 90%, 50% to 80%, 60% to 70%, or around 66%). In some instances, the amount of sweep gas used is 0.5 MT of sweep gas/(hr×MT of material to be coated) to 2.5 MT of sweep gas/(hr×MT of material to be coated). Not to be bound by theory, it is believed that the use of a reduced amount of sweep gas will increase the concentration of solvent carried in the sweep gas. It is believed that the higher concentration of the solvent in the sweep gas enables easier separation of solvent and gas in the subsequent processing steps. Accordingly, one aspect of the methods disclosed herein is a process which comprises heating the coated materials or the side walls of a container and/or internal container containing the coated material with a heat source other than, or in addition to, the sweep gas used to carry the solvent. In these instances, the amount of sweep gas used is less than the amount of sweep gas used in conventional processes that use sweep gas to both heat the coated materials and carry to the solvent. Not to be bound by theory, in the conventional processes wherein no heat source, other than the sweep gas has been used, the conventional process requires a higher volume of sweep gas than some of the methods described herein that use an additional heat source other than the sweep gas.

The following section provide non-limiting descriptions of these additional heating sources that can be used in the context of the present invention.

F. Apparatus to Coat a Material

Apparatuses are described herein that are capable of coating a material such as fertilizer material. In addition to the general processes used to applying coating mixtures to fertilizer material, the apparatuses can evaporate solvent from the coated fertilizer material by using heated sweep gas in the manner described above and/or use additional heating sources such as an electromagnetic radiation source, an external heat source, and/or an internal heat source. Non-limiting examples of such apparatuses are described below, with reference to various figures.

Figure 3:
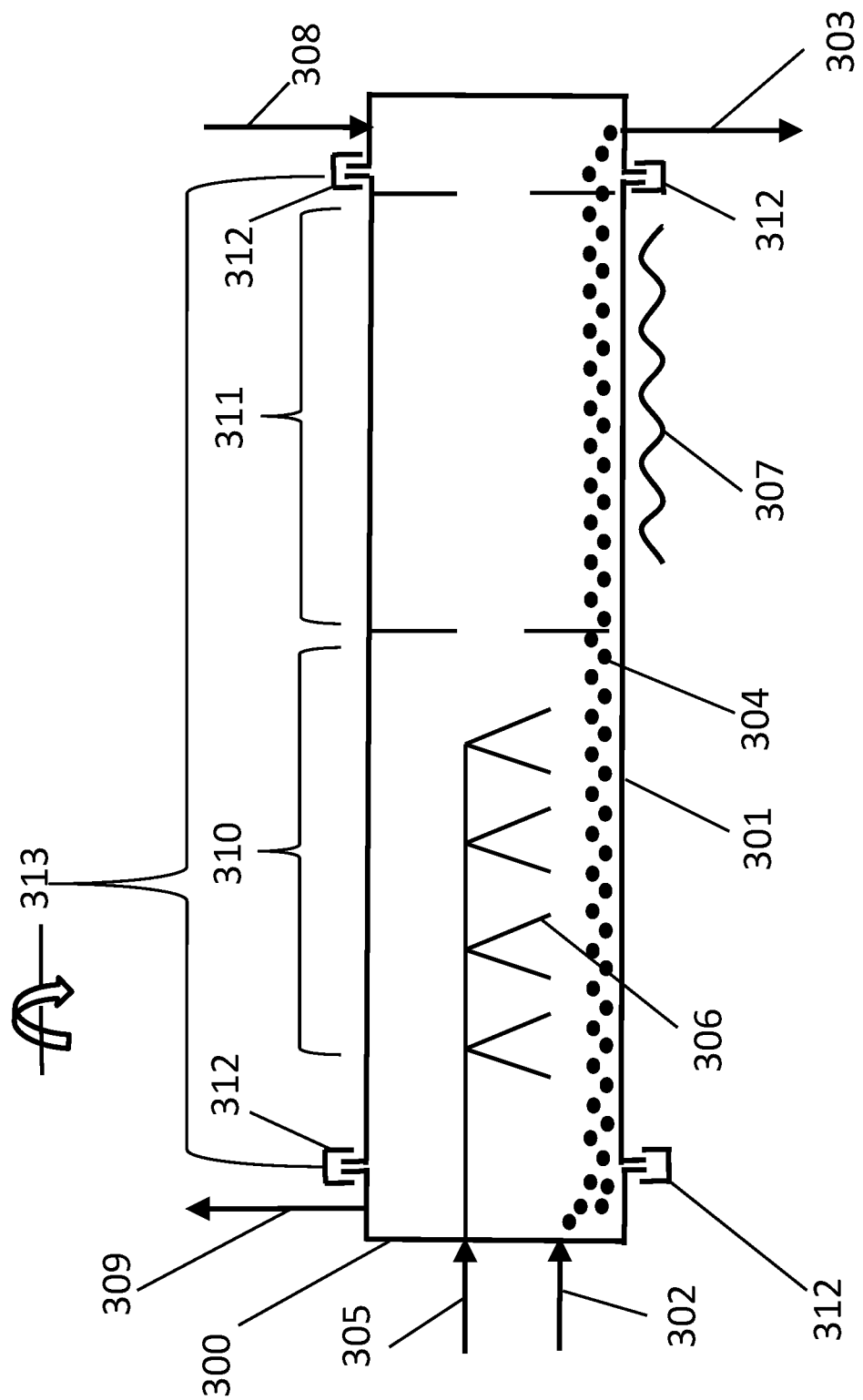
FIG. 3 is a schematic of a system for coating a material and drying the coating on the coated material using electromagnetic radiation, according to embodiments of the invention.

FIG. 3 is a non-limiting schematic of a coating apparatus 300 for coating a material (e.g., fertilizer material) and drying the coating on a coated material 304 using electromagnetic radiation from an electromagnetic radiation source 307. The electromagnetic radiation source 307 can be located downstream from the where the material to be coated is contacted with the coating material. In this way, inadvertent exposure of solvent and coating material to electromagnetic radiation before it contacts the material being coated may be avoided. Although electromagnetic radiation source 307 is shown downstream, the electromagnetic radiation source 307 can be located upstream or at the same location where the material to be coated is contacted with the coating material. In some instances, coated material 304, the container, or the internal container is exposed to electromagnetic radiation from the electromagnetic radiation source 307 in a zone for drying the coated material (drying zone 311) and/or in a zone for coating the material to be coated (coating zone 310).

The amount and wavelength(s) of the electromagnetic radiation can vary depending on the conditions and/or requirements of the process in which it is being used. The wavelength(s) of the electromagnetic radiation can include, but are not limited to wavelengths from 10 µm to 10 km or any range therein. In some instances, the electromagnetic radiation can include microwave, visible light, ultraviolet, and/or infrared radiation. In some instances, the electromagnetic radiation is selected to (i) heat the metal of the coating container 301 and/or an internal container (internal container not shown in FIG. 3 but illustrated in FIG. 5 as element 512) used to hold the material to be coated, (ii) heat water, such as Ultra High Frequency (UHF) microwaves, and/or (iii) heat the material to be coated (e.g., urea particles), the solvent, and/or the coating material. In some instances, the electromagnetic radiation can include electromagnetic radiation with 100 to 400 kHz frequency. In some preferred embodiments, the electromagnetic radiation is ultraviolet and/or infrared radiation. In a more preferred embodiment, the electromagnetic radiation is ultraviolet radiation. In some embodiments, the heat generated from the electromagnetic radiation can be sufficient to evaporate solvent from the coating mixture.

Figure 4:
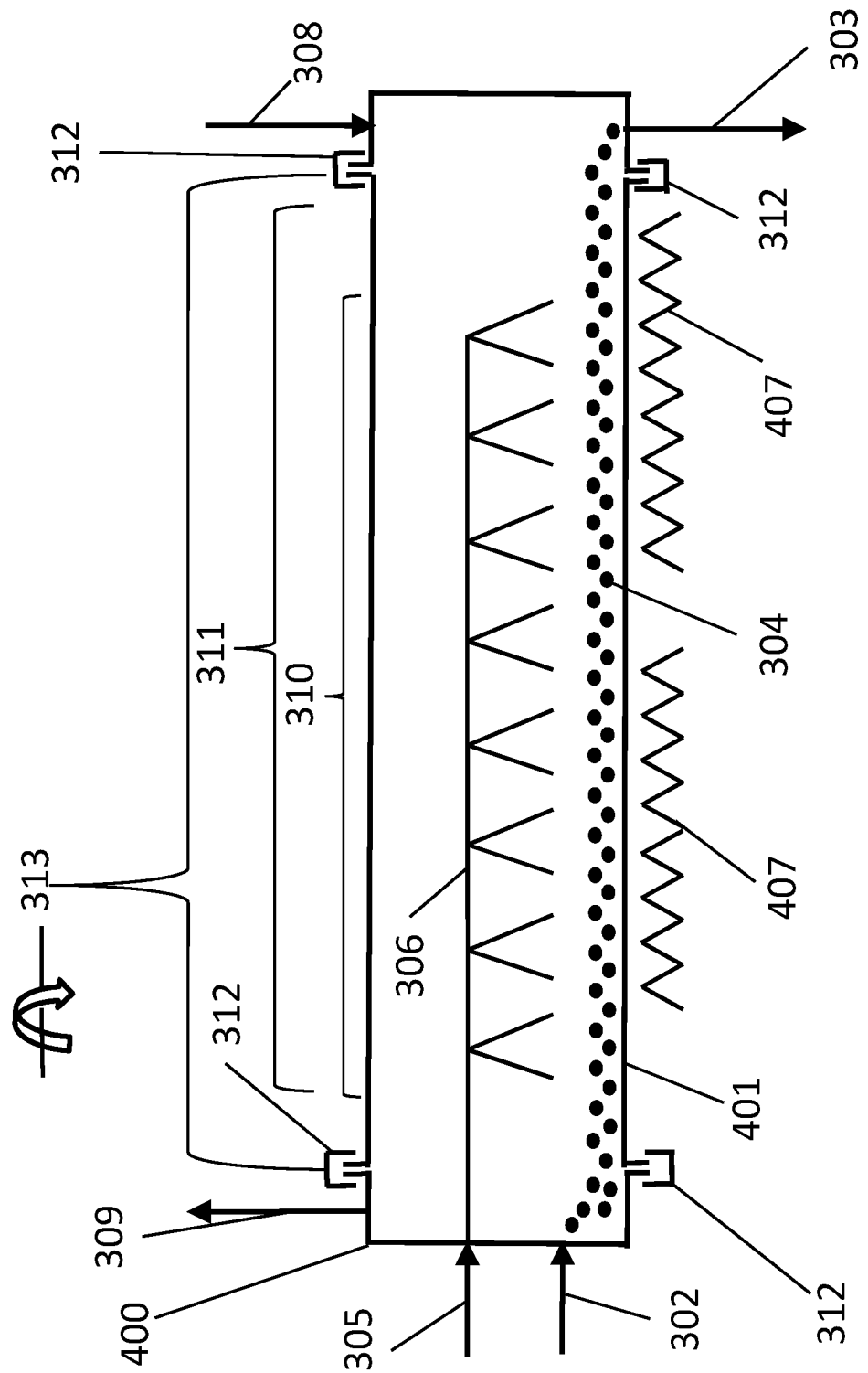
FIG. 4 is a schematic of a system for coating a material and drying the coating on a coated material using a heating source that heats a side wall of a coating container containing the coated material, according to embodiments of the invention.

FIG. 4 is a non-limiting schematic of a coating apparatus 400 for coating a material and drying the coating on coated material 304 using heat source 407 external to the coating container 401 that includes the coated material 304. Although heat source 407 is shown here to be positioned at the location where the coating mixture contacts the material to be coated, heat source 407 can be positioned upstream, at, and/or downstream from where the coating mixture contacts the coated material. In some instances, heat source 407 contacts the side wall of the coating container 401, is in the side wall of the coating container 401, and/or is external to the side wall of the coating container 401. In some instances, coated material 304 is exposed to heat from heat source 407 in drying zone 311 and/or in coating zone 310. Heat source 407 can be any heat source known in the field, including steam, electrical heaters, fuel burning heat sources, heat generated from other processes at the same or a different plant, etc.

Figure 5:
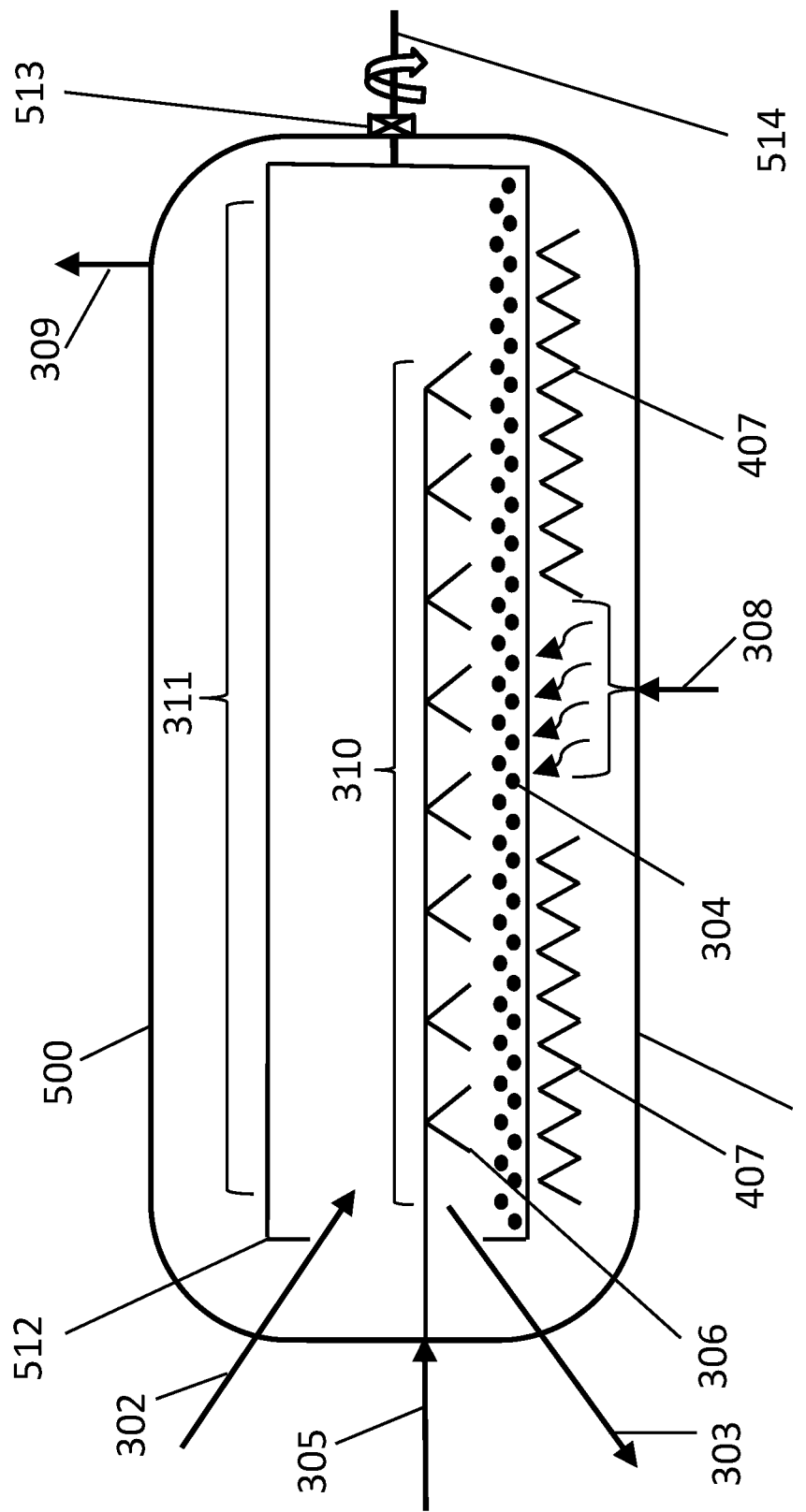
FIG. 5 is a schematic of a system for coating a material and drying the coating on a coated material using a heating source that heats an internal container, the internal container positioned in the interior volume of the coating container and having the coated material, according to embodiments of the invention.

FIG. 5 is a non-limiting schematic of a coating apparatus 500 for coating a material and drying the coating on coated material 304 using heat source 407 configured to heat an internal container 512 (e.g., bed, tray, or rotatable container) for the coated material 304 and/or material to be coated. Although heat source 407 is shown here to be positioned at the location where the coating mixture contacts the material to be coated, heat source 407 can be positioned upstream, at, and/or downstream from where the coating mixture contacts the material to be coated. In some instances, heat source 407 contacts the internal container 512, is external to the internal container 512, and/or is positioned in the internal compartment of coating container 501.

FIG. 6 is a non-limiting schematic of coating apparatus 600 for coating a material and drying the coating on coated material 304 using electromagnetic radiation from electromagnetic radiation source 307 and heat source 407 external to the coating container 601 containing the coated material 304. Although heat source 407 is shown here to be external to the coating container 601, heat source 407 may also or alternatively heat an internal container, such as a tray, a bed, or an internal container 512, such as a rotatable internal container.

The materials of construction, size, and shape of coating apparatuses 300, 400, 500, and 600 can be determined using standard engineering practice and/or modeling programs to achieve the maximum flow rates and appropriate contact time. Coating containers 301, 401, 501, and 601 include material to be coated inlet 302 and coated material outlet 303. Coating apparatuses 300, 400, 500, and 600 may be adapted to move material to be coated and/or coated material 304 between material to be coated inlet 302 and coated material outlet 303. For example, in embodiments of the invention, coating apparatuses 300, 400, 500, and 600 may include a rotatable section 313 rotatably coupled to the apparatus through large mechanical seals 312, an internal container 512 coupled to a shaft 514 that is rotatably coupled to the apparatus through a small mechanical seal 513, and/or a conveyor for moving material to be coated and coated material 304 through coating zone 310 and/or drying zone 311. In some instances, drying zone 311 is downstream from coating zone 310 and do not overlap (see FIG. 3 and FIG. 6). In some embodiments coating zone 310 and drying zone 311 overlap partially or completely (see FIG. 4 and FIG. 5).

In some embodiments, coating containers 301, 401, 501, and 601 are capable of agitating the material to be coated and/or coated material 304, and/or includes an apparatus that can cause such agitation. For example, coating apparatuses 300, 400, 500, and 600 may include a rotatable section, a rotatable internal container, and/or a conveyor that vibrates. In some instances, the rotatable section and/or rotatable internal container may contain internal flights and/or be rotated to induce movement of the material to be coated and/or coated material.

The coating material can be introduced through the coating material inlet 305. In some embodiments, the coating material can be distributed onto the material to be coated by sprayers 306.

Coating containers 301, 401, 501, and 601 contain sweep gas inlet 308 and solvent-enriched sweep gas outlet 309. In some instances, the sweep gas can partially or completely be recovered sweep gas (See for example FIG. 1A, FIG. 1B, and FIG. 7). The sweep gas inlet 308 can be at a lower elevation or higher elevation than the location of some of coated material 304 to allow the sweep gas to flow in an upward or downward direction, respectively, and contact coated material 304. In embodiments, flowing sweep gas upwardly in this way through material to be coated and coated material 304 may agitate these materials. As the sweep gas flows through coating apparatuses 300, 400, 500, and 600 it contacts coated material 304 and/or evaporated solvent, which helps to flow the solvent away from coated material 304 and out of coating apparatuses 300, 400, 500, and 600 through solvent-enriched sweep gas outlet 309. In some embodiments, the solvent-enriched sweep gas is further processed to reduce the amount of solvent therein to form a recovered sweep gas and/or an aqueous-enriched solvent composition (see FIG. 1A and FIG. 1B). In some instances, at least a portion of the recovered sweep gas is used in other processes in the same or a different plant, such as part or all of the solvent entering a coating apparatus. In some instances, at least a portion of the aqueous-enriched solvent composition is used in other processes in the same or a different plant, such as part or all of the solvent entering a coating apparatus.

G. Combinations of Apparatuses

Embodiments of the invention may include a combination of a coating apparatus, a sweep gas recovery apparatus, and an A/S recovery apparatus disclosed herein. As a non-limiting example, referring to FIG. 7, coating apparatus 701, sweep gas recovery apparatus 702, and A/S recovery apparatus 712 can be used in combination in system 700 for producing coated material. Coating apparatus 701, sweep gas recovery apparatus 702, and A/S recovery apparatus 712 can be any one of the respective apparatuses disclosed herein.

A material to be coated (e.g., fertilizer material) can be coated by using coating apparatus 701 of the system 700. A material to be coated, a coating material, and a sweep gas can enter coating apparatus 701 through material to be coated inlet 703, coating material inlet 705, and sweep gas inlet 706, respectively. The sweep gas can be fresh sweep gas (e.g., non-recycled/non-recovered sweep gas) and/or recovered sweep gas. Fresh sweep gas can be supplied to sweep gas inlet 706 through fresh sweep gas line 707. Recovered sweep gas can be supplied to sweep gas inlet 706 through recovered sweep gas line 711. The amount of fresh sweep gas and/or recovered sweep gas can be controlled through valves 719 and 721. A coated material and/or solvent-enriched sweep gas can be produced by coating apparatus 701 by any of the methods disclosed herein. The coated material and the solvent-enriched sweep gas can be removed from the coating apparatus 701 through coated material outlet 704 and solvent-enriched sweep gas line 708, respectively.

The solvent in the solvent-enriched sweep gas can be reduced to produce a recovered sweep gas by using sweep gas recovery apparatus 702 of system 700. The solvent-enriched sweep gas and an aqueous composition can enter sweep gas recovery apparatus 702 through solvent-enriched sweep gas line 708 and aqueous composition inlet 709, respectively. The aqueous composition can be fresh aqueous composition (e.g., non-recycled/non-recovered aqueous composition) and/or recovered aqueous composition. Fresh aqueous composition can be supplied to aqueous composition inlet 709 through fresh aqueous composition line 716. Recovered aqueous composition can be supplied to aqueous composition inlet 709 through recovered aqueous composition line 715. The amount of fresh aqueous composition and/or recovered aqueous composition can be controlled through valves 720 and 722. A recovered sweep gas, a solvent-enriched aqueous composition, and an aqueous-enriched solvent composition can be produced by sweep gas recovery apparatus 702 by any of the methods disclosed herein. The solvent-enriched aqueous composition, aqueous-enriched solvent composition, and recovered sweep gas can be removed from sweep gas recovery apparatus 702 through, respectively, solvent-enriched aqueous composition line 710, aqueous-enriched solvent composition line 723, and recovered sweep gas line 711 and/or recovered sweep gas outlet 717. The recovered sweep gas can be used as part or all of the sweep gas used in coating apparatus 701. In some instances, at least a portion of the recovered sweep gas is used in other processes in the same or a different plant. The aqueous-enriched solvent composition can be used as part or all of the solvent used in coating apparatus 701 (not shown). In some instances, at least a portion of the aqueous-enriched solvent composition is used in other processes in the same or a different plant and/or the water is further reduced from the aqueous-enriched solvent composition to form a solvent.

The solvent in the solvent-enriched aqueous composition can be reduced to produce a recovered aqueous composition, an aqueous-enriched solvent composition, and/or a recovered solvent by using A/S recovery apparatus 712 of system 700. The solvent-enriched aqueous composition and steam can enter A/S recovery apparatus 712 through the solvent-enriched aqueous composition line 710 and the steam inlet 713, respectively. The recovered solvent, aqueous-enriched solvent composition, and the recovered aqueous composition can be removed from A/S recovery apparatus 712, respectively, through the recovered solvent line 714, aqueous-enriched solvent composition solution line 724, and recovered aqueous composition line 715 and/or recovered aqueous composition outlet 718. The recovered aqueous composition can be used as part or all of the aqueous composition used in sweep gas recovery apparatus 702. The recovered solvent and optional aqueous-enriched solvent composition can be used as all or part of and the solvent used in coating apparatus 701. In some instances, at least a portion of the recovered solvent stream, at least a portion of the aqueous-enriched solvent composition, and/or at least a portion of the recovered aqueous composition are used in other processes in the same or a different plant and/or are further refined.

While the apparatuses in FIGS. 1-7 are shown as stand-alone apparatuses, it should be understood that the apparatuses can be portions or zones in a production apparatus, be housed in the same apparatus and/or structure. All of the apparatuses disclosed herein can also include valves, thermocouples, controllers (automated or manual controllers), computers or any other equipment deemed necessary to control or operate the apparatuses. The processing conditions in the apparatuses and systems disclosed herein can be varied to achieve a desired result (e.g., producing a product, intermediate, or stream with specific properties). The processing conditions may include temperature, pressure, flow of the materials entering and exiting the apparatus, location of components, location of apparatuses, wavelengths used, heat sources used, etc. or any combination thereof.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

It has been demonstrated by computer simulation that a sweep gas recovery apparatus as described herein can reduce the amount of solvent in a solvent containing sweep gas by 30 to 90%.

The computer simulation modeled a fertilizer coating system that used $N_2$ as a sweep gas and several different solvents. The system was modeled using a sweep gas with a solvent concentration of 5% to 20% by weight when entering a fertilizer coating process. The coating process produced a solvent-enriched sweep gas carrying 40% to 60% by weight of solvent. The solvent-enriched sweep gas was contacted with an aqueous composition in a sweep gas recovery apparatus that used a pack bed to increase contact between the aqueous composition and the solvent-enriched sweep gas. The aqueous composition entering the sweep gas recover apparatus contained 5% to 20% solvent by weight and had a temperature of between 0 and 10° C. The weight ratio of aqueous composition to the solvent-enriched sweep gas in the sweep gas recover apparatus was from 1:1 to 15:1 weight/weight. Using this modeled sweep gas recovery apparatus, the amount of solvent recovered from the solvent-enriched sweep gas was 30% to 90% by weight of the total solvent present in the gas phase.

The recovered sweep gas was then used as a part of the sweep gas used in a model coating apparatus to determine if the amount of fresh sweep gas used in the process can be reduced. It was demonstrated that use of a recovered sweep gas containing 20% solvent by weight in the fertilizer coating system reduced the amount of fresh sweep gas needed to approximately one third that which was used without using the recycled sweep gas.

These results demonstrate that using the systems, apparatuses, and methods disclosed herein can reduce the cost, reduce the environmental impact, and/or increase the efficiency of fertilizer coating systems that use a sweep gas to remove solvent from the fertilizer coating container.

All of the methods disclosed and claimed herein can be made and executed without undue experimentation in light of the present disclosure. While the apparatuses and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain components which are functionally related may be substituted for the components described herein while the same or similar results would be achieved. All such similar substitutes and modifications apparent to those skilled in the art are deemed to be within the spirit, scope and concept of the invention as defined by the appended claims.

The invention claimed is:

1. A method for removing solvent from a solvent containing sweep gas stream obtained from a fertilizer coating process, the method comprising:
   (a) directly contacting the solvent containing sweep gas stream with an aqueous composition comprising 50% wt/wt to 100% wt/wt of water;
   (b) condensing at least a portion of the solvent out of the solvent containing sweep gas stream into the aqueous composition to produce a solvent-enriched aqueous composition and a recovered sweep gas;
   (c) removing the recovered sweep gas from the solvent-enriched aqueous composition; and
   (d) contacting the solvent-enriched aqueous composition with steam to separate at least a portion of the solvent from the solvent-enriched aqueous composition to produce a recovered solvent and a recovered aqueous composition.

2. The method of claim 1, further comprising recycling at least a portion of:
   (i) the recovered sweep gas as sweep gas in the fertilizer coating process;
   (ii) the recovered aqueous composition for use in the aqueous composition in step (a); and/or
   (iii) the recovered solvent as solvent in the fertilizer coating process.

3. The method of claim 1, wherein all or a part of any remaining water in the recovered solvent is further removed from the recovered solvent.

4. The method of claim 3, wherein all or a part of any remaining water is removed by physisorption or chemisorption, or a combination thereof.

5. The method of claim 1, wherein the solvent in the solvent containing sweep gas stream is an organic solvent.

6. The method of claim 5, wherein the organic solvent comprises chloroform, toluene, methylene chloride, acetonitrile, 1,1,2-trichloroethane, dichlorobenzene, or methyl ethyl ketone, or any combination thereof.

7. The method of claim 1, wherein a sweep gas in the solvent containing sweep gas stream comprises carbon dioxide ($CO_2$), flue gas, or air, or any combination thereof.

8. The method of claim 1, wherein the temperature of the aqueous composition in step (a) is 4° C. to 50° C.

9. The method of claim 1, wherein the flow rate of the solvent containing sweep gas stream in step (a) is 0.5 to 2.5 MT solvent containing sweep gas/MT of a fertilizer to be coated.

10. The method of claim 9, wherein the temperature and pressure of the solvent containing sweep gas stream in step (a) are 40° C. to 150° C. and 0.5 to 3 atmospheres (0.05 to 0.3 MPa), respectively.

11. The method of claim 1, wherein the fertilizer coating process used to obtain the solvent containing sweep gas stream comprises:
   (i) contacting fertilizer particles with a liquid composition comprising a coating material and the solvent in an interior volume of a coating container having a side wall to obtain coated fertilizer particles;
   (ii) evaporating the solvent from the coated fertilizer particles by heating the coated fertilizer particles; and
   (iii) removing the evaporated solvent from the interior volume of the coating container with a sweep gas to produce the solvent containing sweep gas stream.

12. The method of claim 11, wherein the sweep gas is heated and wherein the solvent is evaporated from the coated fertilizer particles by contacting the coated particles with the heated sweep gas.

13. The method of claim 11, wherein the coated fertilizer particles are heated: (a) with electromagnetic radiation to evaporate the solvent by heating the coated particles directly and/or with electromagnetic radiation to evaporate the solvent by heating the particles indirectly through heating the coating container and/or an internal container therein containing the fertilizer particles and/or the coated fertilizer particles, wherein the internal container is disposed in the interior volume of the coating container; (b) with heat generated from an external heat source that is positioned outside of the interior volume of the coating container and is configured to externally heat a portion of the side wall of the coating container and/or internal container to evaporate the solvent; and/or (c) with heat generated from a heat source internal to the coating container and configured to heat the internal container.

14. The method of claim 13, wherein the coated fertilizer particles are heated with electromagnetic radiation to evaporate the solvent, the electromagnetic radiation comprising or consisting of ultraviolet radiation or infrared radiation, or a combination thereof.

15. The method of claim 13, wherein the fertilizer particles are moved from a location where the fertilizer particles are contacted with the liquid composition to a location where the coated fertilizer particles are heated and wherein an electromagnetic radiation source is positioned downstream from where the liquid composition contacts the fertilizer particles in step (i).

16. The method of claim 11, wherein the coated fertilizer particles are heated with heat generated from an external heat source that is positioned outside of the interior volume of the coating container to evaporate the solvent, wherein the fertilizer particles are moved from a location where the fertilizer particles are contacted with the liquid composition to a location where the coated fertilizer particles are heated, and wherein the external heat source is positioned downstream from where the liquid composition contacts the fertilizer particles in step (i).

17. A method for removing solvent from a solvent containing sweep gas stream obtained from a fertilizer coating process, the method comprising:

(a) directly contacting the solvent containing sweep gas stream with an aqueous composition comprising 50% wt/wt to 100% wt/wt of water;
(b) condensing at least a portion of the solvent out of the solvent containing sweep gas stream into the aqueous composition to produce a solvent-enriched aqueous composition and a recovered sweep gas; and
(c) removing the recovered sweep gas from the solvent-enriched aqueous composition, wherein the fertilizer coating process used to obtain the solvent containing sweep gas stream comprises:
(i) contacting fertilizer particles with a liquid composition comprising a coating material and the solvent in an interior volume of a coating container having a side wall to obtain coated fertilizer particles;
(ii) moving the coated fertilizer particles away from the location where the liquid composition contacts the fertilizer particles in step (i);
(iii) evaporating the solvent from the coated fertilizer particles by heating the coated fertilizer particles with heat generated from a heat source positioned external to an internal container containing the coated fertilizer particles, the heat source configured to heat the internal container, wherein the internal container is comprised in the interior volume of the coating container, and wherein the heat source is positioned downstream from where the liquid composition contacts the fertilizer particles in step (i); and
(iv) removing the evaporated solvent from the interior volume of the coating container with a sweep gas to produce the solvent containing sweep gas stream.

\* \* \* \* \*